United States Patent [19]

Kasai

[11] Patent Number: 5,251,311
[45] Date of Patent: Oct. 5, 1993

[54] METHOD AND APPARATUS FOR PROCESSING INFORMATION AND PROVIDING CACHE INVALIDATION INFORMATION

[75] Inventor: Hiroyoki Kasai, Yamanashi, Japan

[73] Assignee: Nec Corporation, Tokyo, Japan

[21] Appl. No.: 595,575

[22] Filed: Oct. 11, 1990

[30] Foreign Application Priority Data

Oct. 12, 1989 [JP] Japan .................... 1-265733

[51] Int. Cl.$^5$ .............................................. G06F 12/00
[52] U.S. Cl. .............................. 395/425; 364/DIG. 1
[58] Field of Search ............... 364/200, 900; 395/400, 395/425

[56] References Cited

U.S. PATENT DOCUMENTS

| | | | |
|---|---|---|---|
| 4,467,411 | 8/1984 | Fry et al. | 395/250 |
| 4,622,631 | 11/1986 | Frank et al. | 395/800 |
| 4,835,678 | 5/1989 | Kofuji | 395/250 |
| 4,851,991 | 7/1989 | Rubinfeld et al. | 395/250 |
| 4,888,679 | 12/1989 | Fossum et al. | 395/800 |
| 4,888,681 | 12/1989 | Barnes et al. | 395/600 |
| 4,965,717 | 10/1990 | Cutts, Jr. et al. | 364/200 |
| 5,045,996 | 9/1991 | Barth et al. | 395/425 |
| 5,056,002 | 10/1991 | Watanabe | 364/200 |
| 5,077,658 | 12/1991 | Bendert et al. | 395/600 |
| 5,091,845 | 2/1992 | Rubinfeld | 395/425 |
| 5,140,681 | 8/1992 | Uchiyama et al. | 395/425 |
| 5,148,536 | 9/1992 | Witer et al. | 395/425 |
| 5,980,816 | 12/1990 | Fukuzawa et al. | 395/400 |

OTHER PUBLICATIONS

Tang, C. K., "Cache system design in the tightly coupled multiprocessor system", Proceedings of the National Computer Conference, 1976, pp. 749-753.

Primary Examiner—Alyssa H. Bowler
Assistant Examiner—Reba I. Elmore
Attorney, Agent, or Firm—Foley & Lardner

[57] ABSTRACT

An information processing system includes a main memory, a request source, a data buffer, a memory request control unit, and a cache invalidation control unit. The request source generates a memory request to the main memory. The data buffer is provided between the request source and the main memory and temporarily stores memory request information from the request source. The memory request control unit reads out the memory request information from the data buffer to execute and control access of the main memory. The cache invalidation control unit controls cache invalidation processing with respect to the request source on the basis of the memory request information. The information processing system further includes a data read address buffer and a data buffer control unit. The data read address buffer stores a storage address of the memory request information in the data buffer. The data buffer control unit reads out the storage address in the data read address buffer to access the data buffer. A memory request address of the memory request information read out from the data buffer is used to perform the cache invalidation processing with respect to the request source.

2 Claims, 4 Drawing Sheets

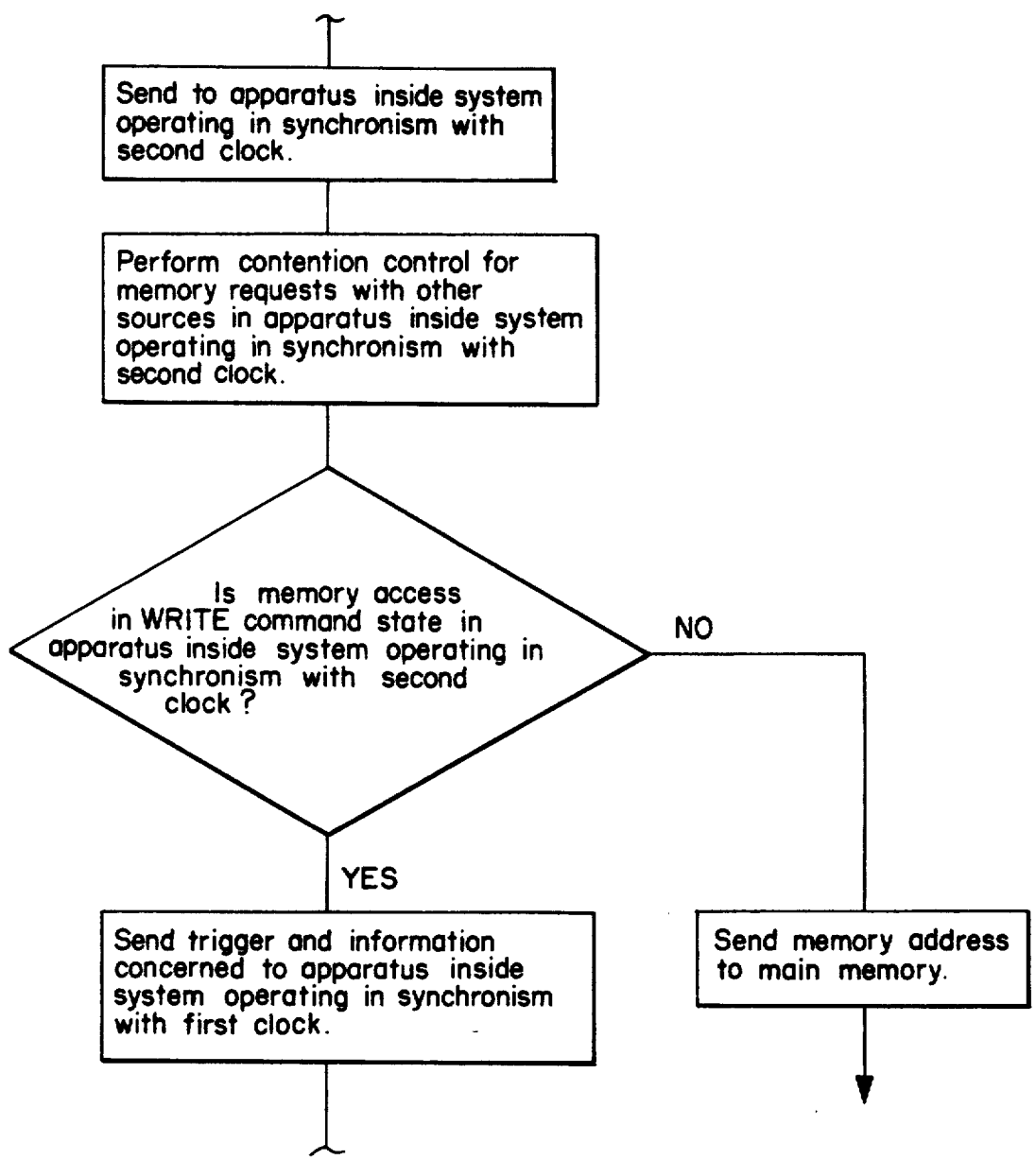

METHOD AND APPARATUS FOR PROCESSING INFORMATION AND PROVIDING CACHE INVALIDATION INFORMATION

BACKGROUND OF THE INVENTION

The present invention relates to an information processing system and, more particularly, to a cache invalidation control system.

In conventional techniques, an information processing apparatus in which a main memory and an I/O unit or an arithmetic processor (request source of a memory request) operate by asynchronous clocks is available. In such an information processing apparatus, a memory access control unit comprises a first control unit which operates in synchronism with the request source, and a second control unit which operates in synchronism with the main memory. When the request source accesses the main memory, the first control unit accepts the request and stores memory access information in a data buffer predetermined for each request source. The information is stored in the data buffer until it is read out by a read address stored in the first control unit in order to send a processor number which is a part of the memory access information stored in the data buffer or reply information indicating the presence/absence of reply data to an arithmetic processor of the request source after a reply returns in response to the request.

The first control unit sends the request to the second control unit. When the second control unit receives the request, it performs contention control with requests from other request sources. If the request can be processed, the second control unit supplies the read address to the data buffer to read out the memory access information and sends the memory access information with the request to the main memory.

In addition, the second control unit includes a buffer for storing a memory request address which is a part of the memory access information. When the second control unit sends a memory request to the main memory, the type of instruction of the memory request is determined. If the instruction is a store instruction, the memory request addresses of the memory access information are stored in the special buffer in the order that they are sent to the main memory, and a cache invalidation request is issued to the first control unit.

The first control unit receives the cache invalidation request sent from the second control unit and supplies the read address to the buffer of the second control unit in which the memory request address is stored, thereby reading out the memory request address. The first control apparatus sends the cache invalidation request with the readout memory request address to the request source having a cache function.

In the above conventional cache invalidation control system, a special buffer having a capacity capable of storing memory request addresses must be provided in the second control unit in order to invalidate a cache. In addition, since a number of signal lines must be provided to send the memory request addresses from the buffer in the second control unit to the first control unit, the number of signal lines between interfaces is increased, and the amount of hardware required is increased.

SUMMARY OF THE INVENTION

The present invention has been, made to solve the above problems of the conventional system, and has as its object to provide an information processing system in which no special buffer for storing memory request addresses to be stored for cache invalidation control need be provided.

In order to achieve the above object of the present invention, there is provided an information processing system which includes a main memory; a request source for generating a memory request to the main memory; a data buffer, provided between the request source and the main memory, for temporarily storing memory request information from the request source; memory request control means for reading out the memory request information from the data buffer to execute and control access of the main memory; and cache invalidation control means for controlling cache invalidation processing with respect to the request source on the basis of the memory request information. The information processing system further includes a data read address buffer for storing a storage address of the memory request information in the data buffer, and data buffer control means for reading out the storage address in the data read address buffer to access the data buffer. A memory request address of the memory request information read out from the data buffer is used to perform the cache invalidation processing with respect to the request source.

BRIEF DESCRIPTION OF THE DRAWINGS

The FIG. 1 is a block diagram showing a system according to an embodiment of the present invention.

FIGS. 2A-2C depict a flow chart of a method according to an embodiment of the instant invention.

DETAILED DESCRIPTION OF THE PREFERRED EMBODIMENT

An embodiment of the present invention will be described below with reference to the accompanying drawing.

Figure 1:
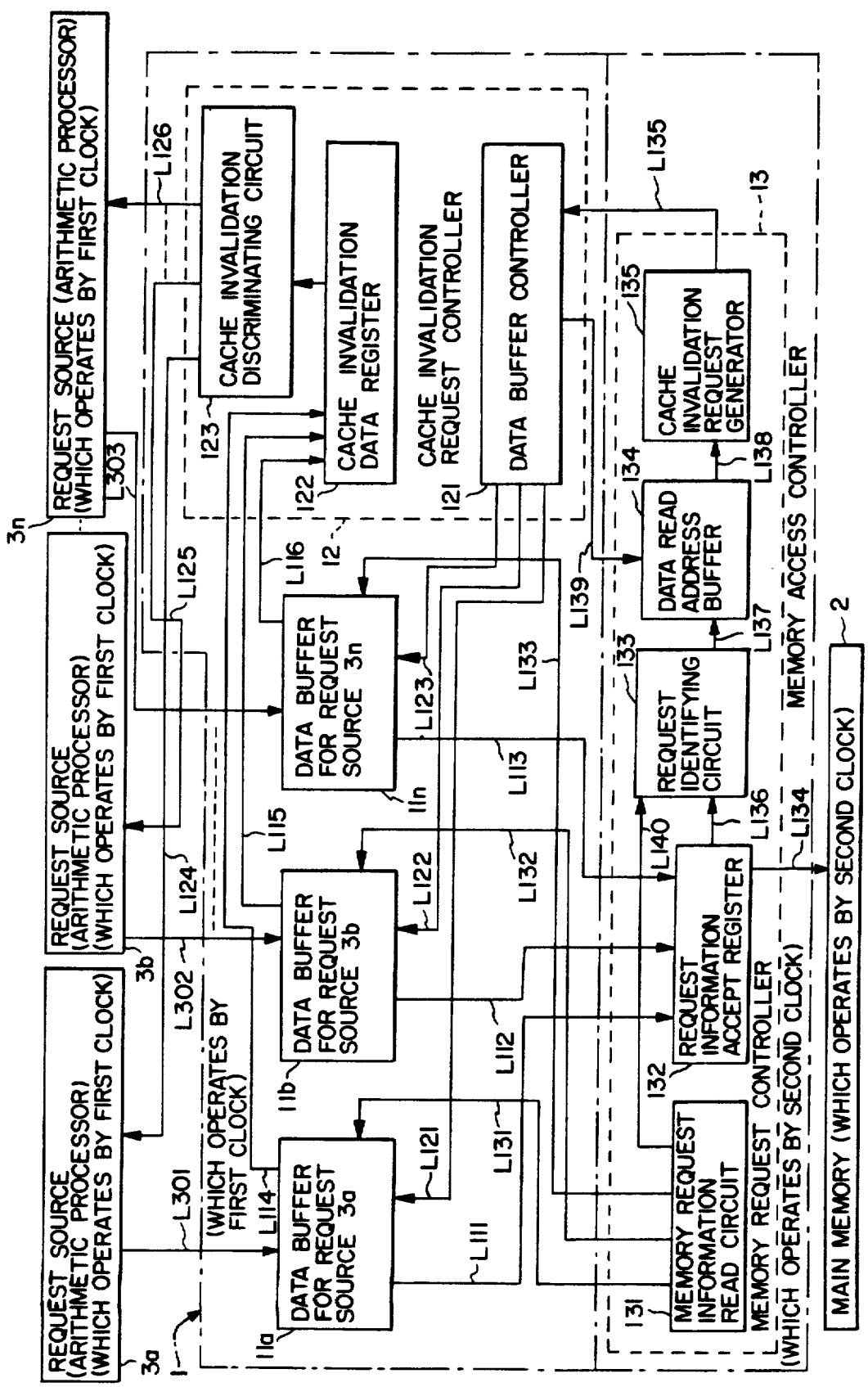

The FIG. 1 shows a system according to an embodiment of the present invention. Referring to the drawing, a memory access controller 1 is arranged between a main memory 2 which operates in synchronism with a second clock and arithmetic processors 3a to 3n (request sources of a memory request) which operate in synchronism with a first clock, and constituted by a memory request controller 13 which operates in synchronism with the second clock, data buffers 11a to 11n which operate in synchronism with the first clock and are provided in correspondence with the request sources, and a cache invalidation request controller 12.

Each of the data buffers 11a to 11n provided in correspondence with the request sources can be accessed by two read addresses.

The memory request controller 13 comprises a memory request information read circuit 131 for generating a data buffer address for reading out memory access information from the data buffers 11a to 11n provided in correspondence with the request sources, a request information accept register 132 for storing the readout data, a request identifying circuit 133 for identifying the type of instruction of a request, a data read address buffer 134 for storing a read address of a data buffer, and a cache invalidation request generator 135 for issuing a cache invalidation request for cache invalidation.

The cache invalidation request controller 12 comprises a data buffer controller 121 for controlling the data buffers 11a to 11n provided in correspondence with the request sources, a cache invalidation data register 122 for storing a memory request address read out from the data buffer controller 121, and a cache invalidation discriminating circuit 123 for discriminating the presence/absence of a cache function of a request source.

An operation performed when, for example, the arithmetic processor 3a which operates by the first clock successively issues memory requests to the main memory 2 which operates by the second clock will be described below with reference to the drawing.

A memory request issued by the arithmetic processor 3a is supplied to the memory access controller 1 through a line L301, and memory access information supplied together with the memory request is stored in the data buffer 11a provided in the memory access controller 1 and corresponding to the request source.

The memory request is sent to the memory request controller 13 which operates with the second clock and received by the memory request information read circuit 131. The memory request information read circuit 131 performs contention control for memory requests with other arithmetic processors 3b to 3n. If the memory request can be processed, a data buffer address is generated in order to read out the memory access information from the data buffer 11a corresponding to the memory request.

The memory request information read circuit 131 sends the data buffer address to the data butter 11a through a line L131. The memory access information read out from the data buffer is stored in the request information accept register 132 through a line L111. The memory access information stored in the request information accept register is sent together with the memory request to the main memory 2 through a line L134.

When the memory access information is stored in the request information accept register 132, the request identifying circuit 133 identifies the type of instruction of the memory request. If the instruction is a store instruction, the request identifying circuit 133 sends a valid signal to the cache invalidation request generator 135. The cache invalidation request generator 135 receives the valid signal and stores the data buffer address used to read out the memory access information from the data buffer 11a and the number of the data buffer corresponding to the memory request in the data read address buffer 134 in the order of sending the memory requests to the main memory 2.

In addition, the cache invalidation request generator 135 sends a cache invalidation request to the data buffer controller 121 of the cache invalidation request controller 12 through a line L135. When the data buffer control 121 receives the cache invalidation request, the data buffer controller 121 generates a read address for reading out the data buffer address stored in the order of sending the memory access information to the main memory 2 and the number of the data buffer corresponding to the memory request from the data read address buffer 134 of the memory request controller 13, and supplies the read address to the data read address buffer 134 through a line L139, thereby reading out the data buffer address and the data buffer number.

The data buffer controller 121 identifies the corresponding data buffer 11 in accordance with the data buffer number and supplies the data buffer addresses to the data buffer 11 through a line L121. The data buffer controller 121 reads out the corresponding memory request address and stores the readout address in the cache invalidation data register 122.

The cache invalidation request is sent to the cache invalidation discriminating circuit 123. The cache invalidation discriminating circuit 123 discriminates the presence/absence of a cache function of a processor and sends the memory request address with the cache invalidation request to a processor having the cache function through a line L124.

Figure 2A:
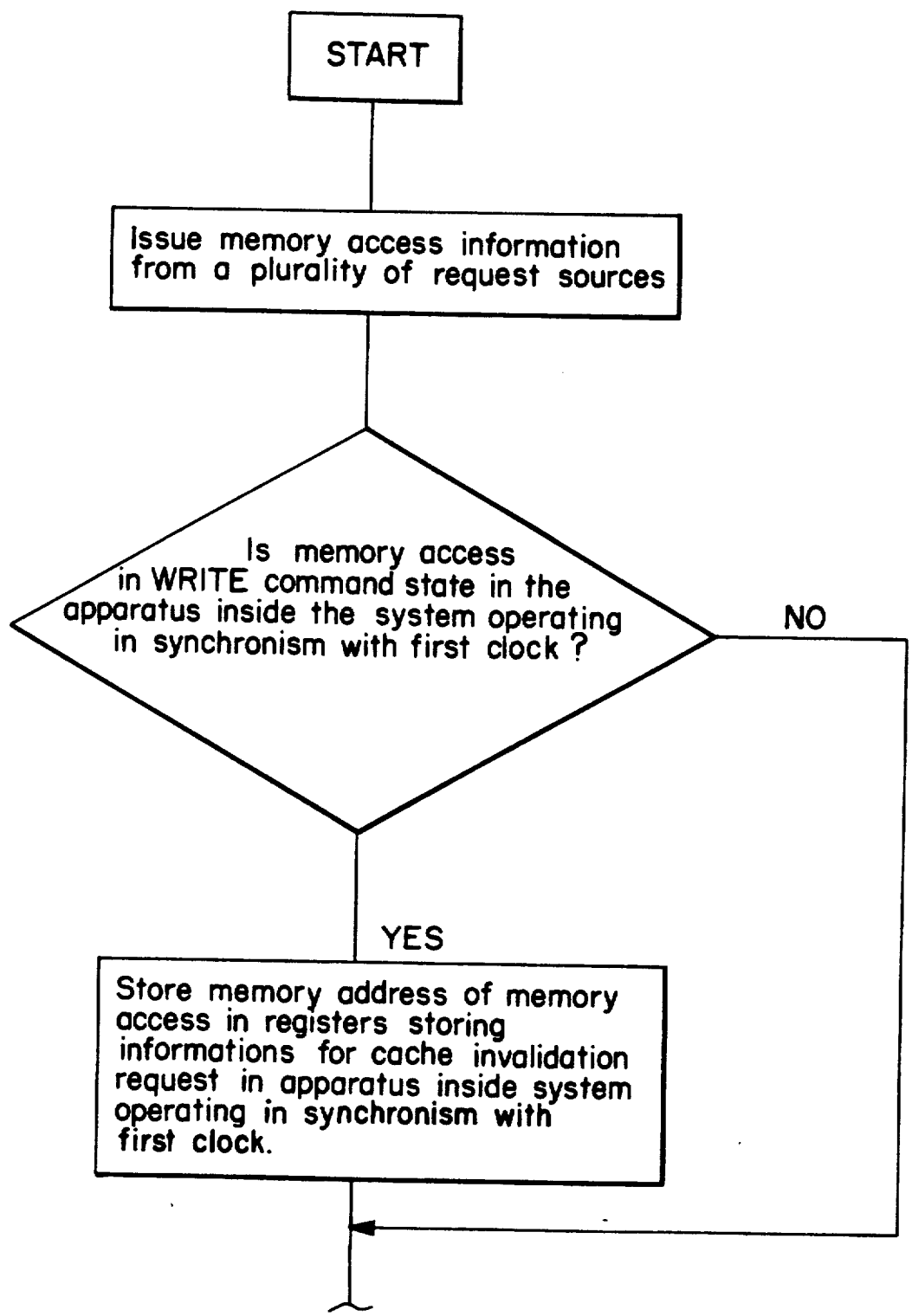
Figure 2C:
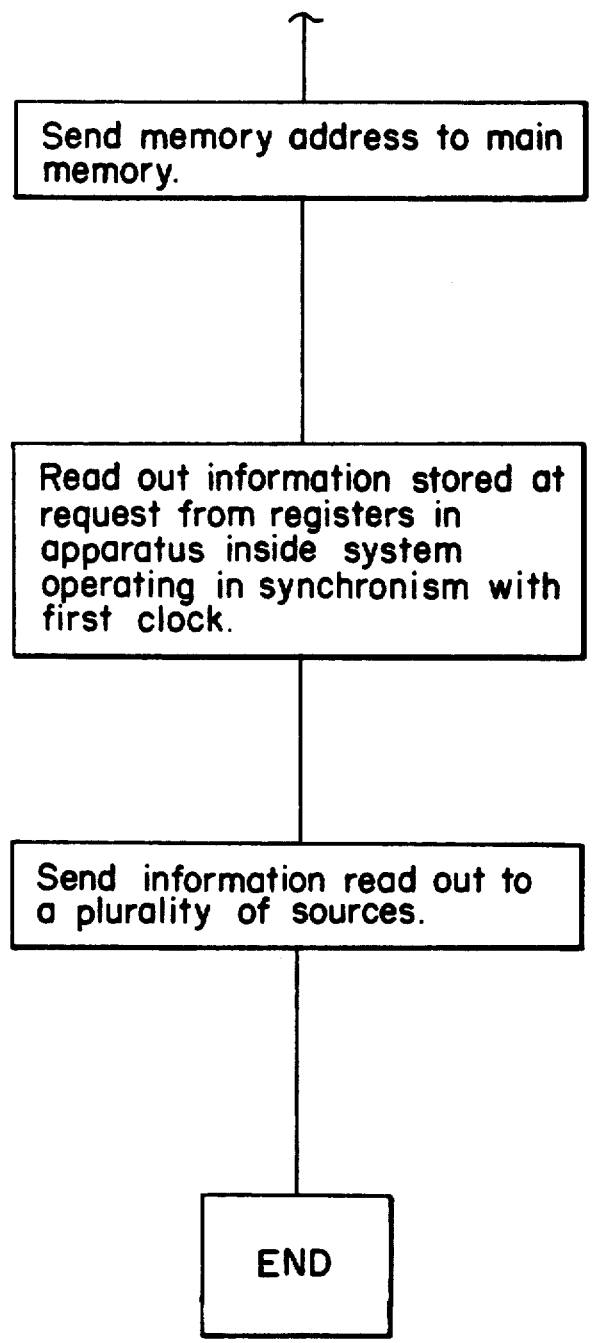

A method of the above detailed processes is depicted in FIGS. 2A-2C.

As has been described above, according to the present invention, a data buffer address for reading out a memory request address from a data buffer which stores memory request information is stored in an additional data read address buffer. In cache invalidation processing, the data buffer address stored in this buffer is read out to access the data buffer, thereby reading out the main memory address for cache invalidation. Therefore, since no special buffer for storing the main memory address need be provided, the amount of hardware required can be decreased.

What is claimed is:

1. An information processing system operating asynchronously under a first and a second clock for processing a cache invalidation operation, said system comprising:

a main memory operating in synchronism with said second clock;

a request source operating in synchronism with said first clock, including means for performing a cache function, said request source outputting a memory request and memory request information to said main memory;

a data buffer operating in synchronism with said first clock, provided between said request source and said main memory, receiving and temporarily storing said memory request information from said request source;

memory request control means operating in synchronism with said second clock for reading out said memory request information from said data buffer to execute and control access of said main memory; and cache invalidation control means for controlling cache invalidation processing with respect to said request source on the basis of the memory request information, said memory request control means including a data read address buffer for storing a storage address of said memory request information in said data buffer; and said cache invalidation control means including a data buffer controller supplying a read address to said data read address buffer and reading out said storage address in said data read address buffer to access said data buffer, a register storing a memory request address of said memory request information read out from said data buffer in response to said storage address, and a cache invalidation discrimination circuit, receiving said memory request address and outputting said memory request address and a cache invalidation request to said request source.

2. A method of processing information between processors operating in synchronism with a first clock, each of said processors having means for performing a cache function, and a main memory operating in synchronism with a second clock, comprising the steps of:

issuing a memory request from one of said processors;

storing said memory request and memory access information in a data buffer corresponding to said one of said processors in synchronism with said first clock;

performing contention control on remaining processors;

generating a data buffer address for reading out said memory access information from said data buffer;

reading said memory access information from said data buffer;

sending said memory access information and said memory request to said main memory;

identifying a type of said memory request, said type included in said memory access information; and outputting a cache invalidation request when said type indicates a store operation, wherein when said cache invalidation request is output, the following steps are included storing a storage address indicating said data buffer corresponding to said one of said processors holding said memory access information in a data read address buffer, supplying said data read address buffer with a read address, said data read address buffer operating in synchronism with said second clock, identifying said data buffer corresponding to said one of said processors from said data address read buffer, reading a memory request address in said data buffer corresponding to said one of said processors, and supplying said one of said processors with said memory request address and with the cache invalidation request.

* * * * *